United States Patent [19]

Marks

[11] 4,203,569
[45] May 20, 1980

[54] FIN AND NOZZLE UNIT FOR A FREE-FLIGHT ROCKET

[75] Inventor: William S. Marks, Little Rock, Ark.

[73] Assignee: BEI Electronics, Inc., Little Rock, Ark.

[21] Appl. No.: 842,381

[22] Filed: Oct. 17, 1977

[51] Int. Cl.² .............................................. F42B 13/32
[52] U.S. Cl. ................................. 244/3.23; 244/3.28; 244/3.29
[58] Field of Search ................... 244/3.27, 3.28, 3.29, 244/3.3, 3.23

[56] References Cited

U.S. PATENT DOCUMENTS

| | | | |
|---|---|---|---|
| 2,465,401 | 3/1949 | Skinner | 244/3.28 |
| 2,700,377 | 12/1955 | Cumming | 244/3.28 |
| 2,801,587 | 8/1957 | Gould | 244/3.29 |
| 3,058,422 | 10/1962 | Olsson | 244/3.29 |
| 3,125,956 | 3/1964 | Kongelbeck | 244/3.29 |
| 3,185,097 | 5/1965 | Cushing | 244/3.28 |
| 3,390,850 | 7/1968 | Dahlke | 244/3.28 |
| 3,598,345 | 8/1971 | Suter | 244/3.28 |
| 3,918,664 | 11/1975 | Grosswendt | 244/3.28 |
| 3,952,970 | 4/1976 | Orzechowski | 244/3.29 |

Primary Examiner—Samuel W. Engle
Assistant Examiner—Edward F. Miles
Attorney, Agent, or Firm—Burmeister, York, Palmatier, Hamby & Jones

[57] ABSTRACT

The disclosed fin and nozzle unit comprises a generally cylindrical nozzle body having an axial nozzle opening therein for discharging a gaseous propulsion stream, a plurality of fins having pivot means mounting such fins on a rear end portion of the nozzle body for swinging movement between retracted launch positions and extended flight positions in which such fins are swung outwardly from the launch positions through a predetermined angle, such fins having bent or skewed portions which are positioned in the gaseous propulsion stream when the fins are in their retracted launch positions for causing the gaseous propulsion stream to act upon the bent portions so as to produce spinning movement of the rocket when it is being launched, the bent portions being movable outwardly out of the gaseous propulsion stream when the fins are swung outwardly into their extended flight positions to avoid imparting further spin to the rocket during flight. The fins preferably have a conformation which is aerodynamically neutral when the fins are in their extended flight positions. To such end, each fin is preferably bent along a line which is parallel to the axis of the nozzle body when the fin is extended. Detent elements are preferably resiliently biased against detent cams on the fins to hold the fins in their extended flight position. The detent elements also preferably hold additional fin members in their retracted launch position until the first mentioned fins swing outwardly to their flight positions, whereupon the additional fin members are released by said detent elements and are swung outwardly to their extended flight positions by spring means.

14 Claims, 10 Drawing Figures

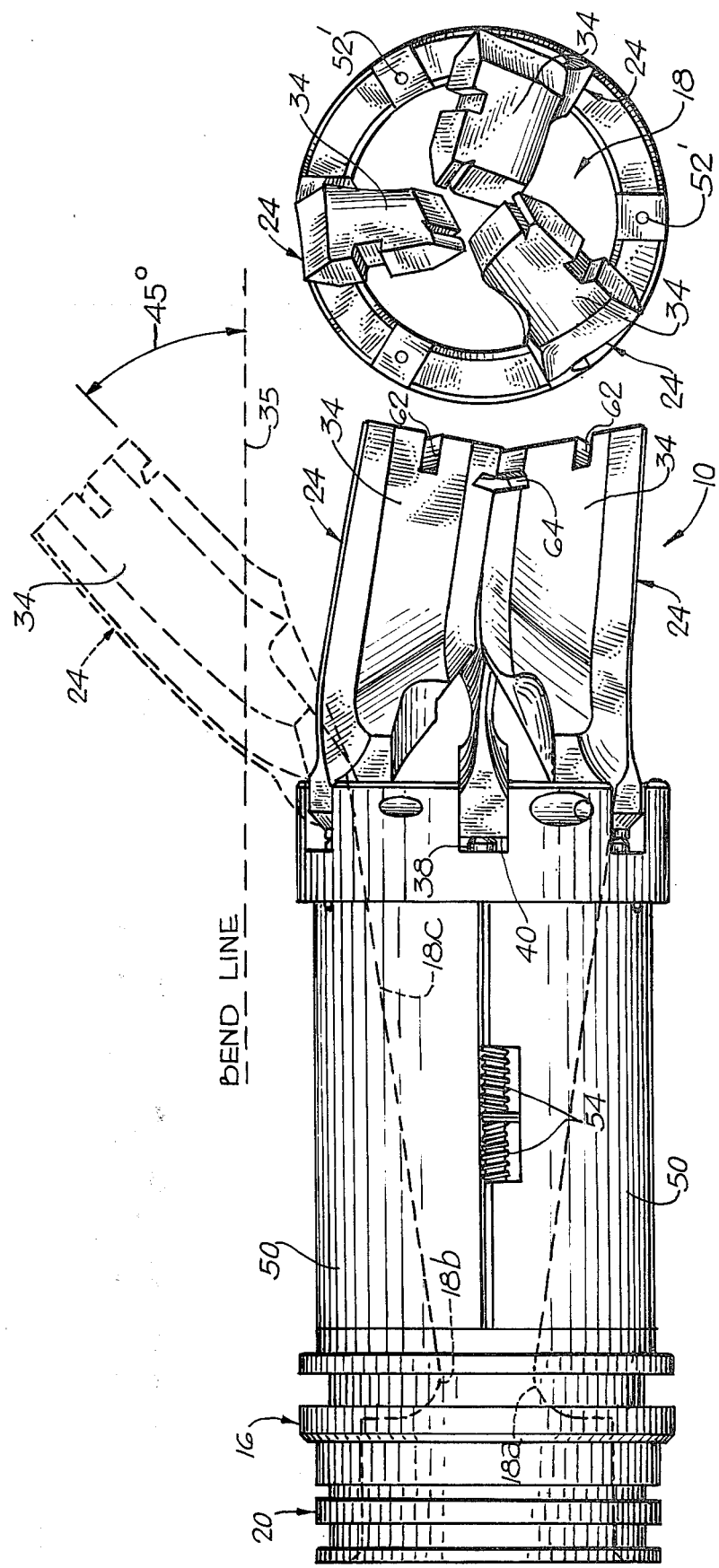

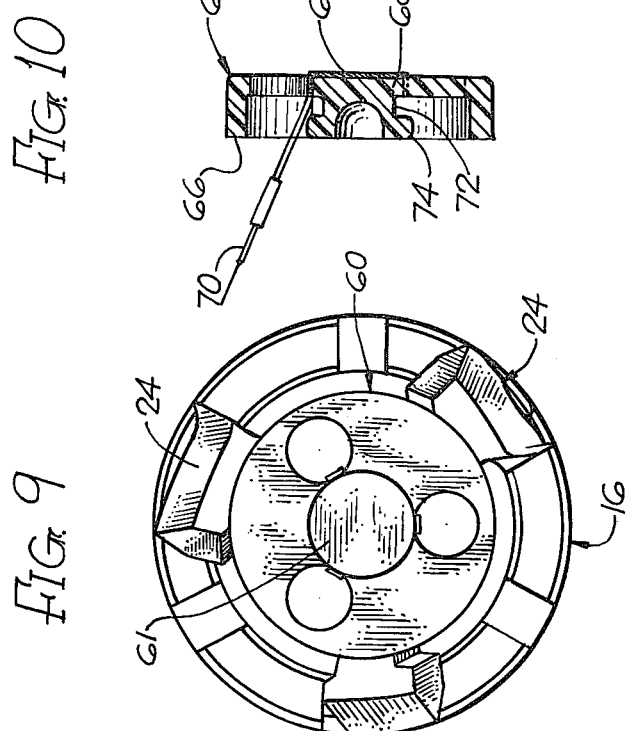

FIN AND NOZZLE UNIT FOR A FREE-FLIGHT ROCKET

FIELD OF THE INVENTION

This invention relates to a fin and nozzle unit for a free-flight rocket adapted to be launched from a launching tube. The invention is particularly applicable to military rockets which may be launched from launching tubes on a military helicopter, other aircraft, or on the ground.

The general object of the present invention is to improve the performance and accuracy of such free-flight rockets.

BACKGROUND

In the prior art, the usual rocket motor has folded flatblade fins which extend to the rear of the motor case, with four nozzle assemblies between them. The fins deploy after the rocket exits the launching tube, and are locked in an extended position at an angle of 45 degrees from the rocket axis. The rocket velocity at the exit from the launcher tube is generally insufficient to achieve adequate fin stabilization unless the rocket is fired from a high-velocity aircraft or other vehicle. Motors for rockets intended to be deployed from helicopters or other low velocity vehicles have been made with scarfed nozzles to impart some spin stabilization to such rockets during early flight. Spin velocities of 8 to 11 revolutions per second, achieved by this method, reduce dispresion of the rockets, but the continued application of the torque force after fin deployment produces a yaw motion which is undesirable.

Other prior rocket constructions have attempted to deal with this problem by inserting canted vanes into the rocket nozzle, while constructing the vanes so that they are burned out early in flight. However, difficulties have been encountered due to nonuniformity in the burn-out of the vanes. Moreover, the burn-out of the vanes may produce debris in some cases, which is undesirable because such debris may possibly damage the helicopter.

SUMMARY OF THE INVENTION

One principal object of the present invention is to provide a new and improved construction which will impart spin to a rocket while it is in its launching tube, but will not impart additional spin after the rocket is in free flight, while avoiding the production of any debris. Thus, the stabilization of the rocket is improved, without any of the disadvantages of the prior art.

In accordance with the present invention, these and other objects are achieved by providing a fin and nozzle unit for a rocket, comprising a generally cylindrical nozzle body having an axial nozzle opening therein for discharging a gaseous propulsion stream, and a plurality of fins having pivot means swingably mounting such fins on the rear end portion of the nozzle body for swinging movement between retracted launch positions and extended flight positions in which such fins are swung outwardly from the launch positions through a predetermined angle, the fins having bent, skewed or canted portions which are positioned in the gaseous propulsion stream when the fins are in their retracted launch positions for causing the gaseous propulsion stream to act upon such bent portions so as to produce spinning movement of the rocket, the bent portions being movable outwardly out of the gaseous propulsion stream when the fins are swung outwardly into their extended flight positions, so as to avoid imparting further spin to the rocket when the fins are extended to their flight positions. The fins are preferably constructed so that they are aerodynamically neutral when they are extended into their flight positions. To such ends, the fins are preferably bent along lines which are parallel to the axis of the nozzle body when the fins are extended.

Detent means are preferably provided to hold the fins in their extended flight positions. Such detent means may include detect elements which are resiliently biased against detent cams on the fins.

Such detect elements may also be arranged to control the deployment of additional fin members. Thus, the detent elements may be arranged to hold such additional fin members in their folded positions, when the first-mentioned fins are folded, and to release the additional fin members for outward swinging movement by spring means, when the first-mentioned fins swing outwardly to their extended flight positions.

THE DRAWINGS

Further objects, advantages and features of the present invention will appear from the following description, taken with the accompanying drawings, in which:

FIG. 6 is a side elevational view of the fin and nozzle unit, with the fins folded.

FIG. 7 is a rear view of the unit, with the fins folded.

FIG. 8 is a side elevational view, taken from a different angle.

FIG. 9 is a rear view with a retainer in place on the fins.

FIG. 10 is a section through the retainer.

DETAILED DESCRIPTION OF EMBODIMENT

Figure 1:
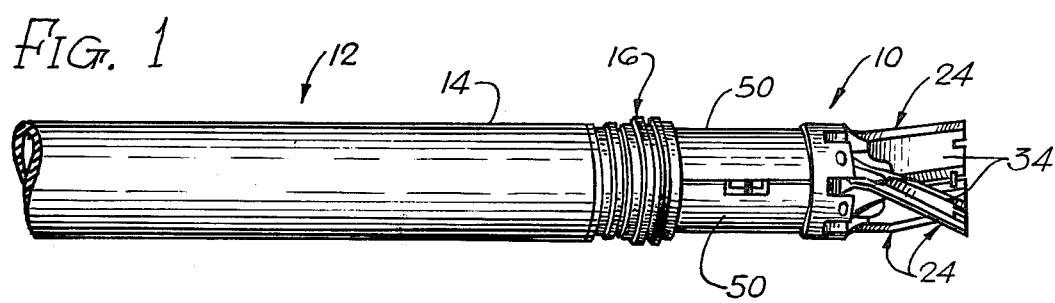
FIG. 1 is a fragmentary side-elevational perspective view of a military rocket having a fin and nozzle unit to be described as an illustrative embodiment of the present invention, the fins being shown in their folded or retracted positions.

As just indicated, FIG. 1 shows an illustrative embodiment of the present invention, in the form of a fin and nozzle unit 10, mounted on a military rocket 12, adapted to be launched into free flight from a launching tube, which may be mounted on a helicopter, on any other aircraft or vehicle, or on the ground. Only the rear portion of the rocket 12 is shown. Except for the fin and nozzle unit 10, the rocket 12 may be of any known or suitable construction. As shown, the rocket 12 comprises a cylindrical rocket motor casing 14 in which a rocket motor is mounted. The fin and nozzle unit 10 is mounted on the rear end of the casing 14.

The illustrated fin and nozzle unit 10 comprises a generally cylindrical nozzle body 16 having an axial nozzle opening 18 therein from which the rocket motor causes the discharge of a gaseous propulsion stream. The illustrated nozzle opening 18 has a converging front portion 18a, a relatively constricted throat portion 18b, and a flaring rear portion 18c, as clearly shown in FIGS. 4 and 5.

The nozzle body 16 has a front end portion 20 which is suitably secured to the rocket motor casing 14. In addition, the nozzle body 16 has a rear end portion 22 which supports a plurality of folding fins 24 which may be described as rear or tail fins. In this case, there are three of the rear fins 24, equally spaced around the nozzle body 16, but any desired number of fins may be provided. The folding fins 24 are swingably supported by pivot means, taking the form in this case of pivot pins 26, extending through openings 28 in the inner end portions 30 of the fins 24. The inner end portions 30 are confined within slots or notches 32 formed in the rear end portion 22 of the nozzle body 16.

Figure 2:
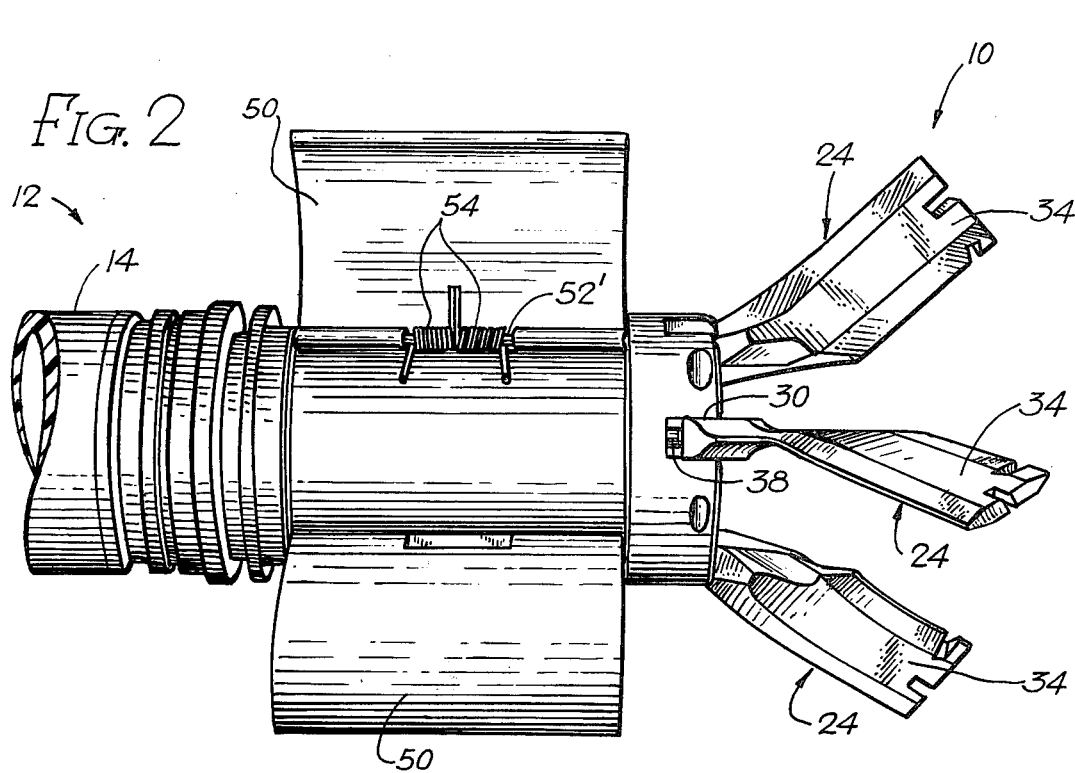
FIG. 2 is a fragmentary side elevational perspective view on a somewhat larger scale, showing the fin and nozzle assembly, with the fins deployed or swung outwardly to their extended flight positions.
Figure 3:
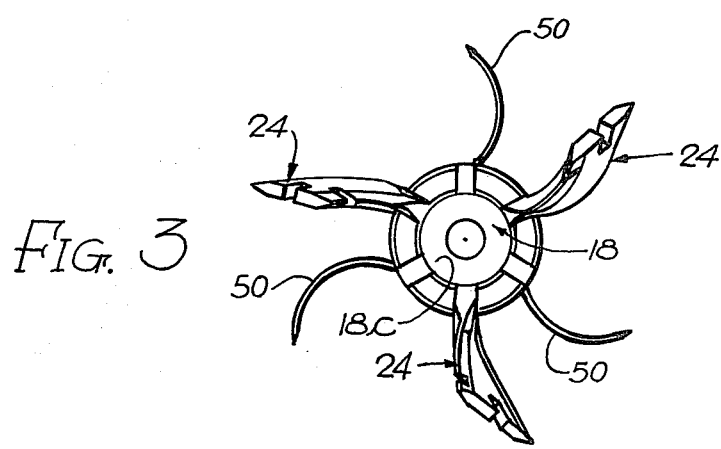
FIG. 3 is a rear view showing the fins in their extended positions.
Figure 4:
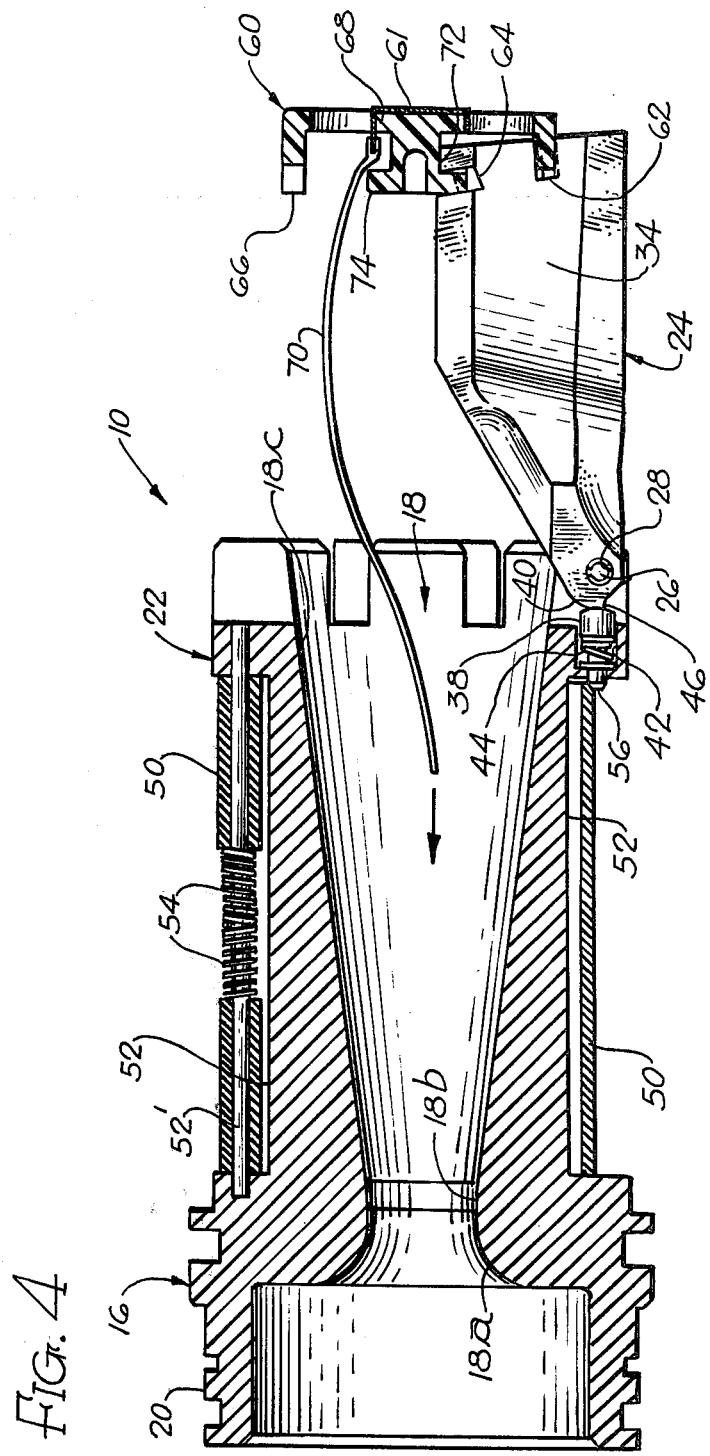
FIG. 4 is a longitudinal section, taken through the fin and nozzle unit, and showing one of the rear fins and two of the wrap-around fins in their folded or retracted positions.
Figure 5:
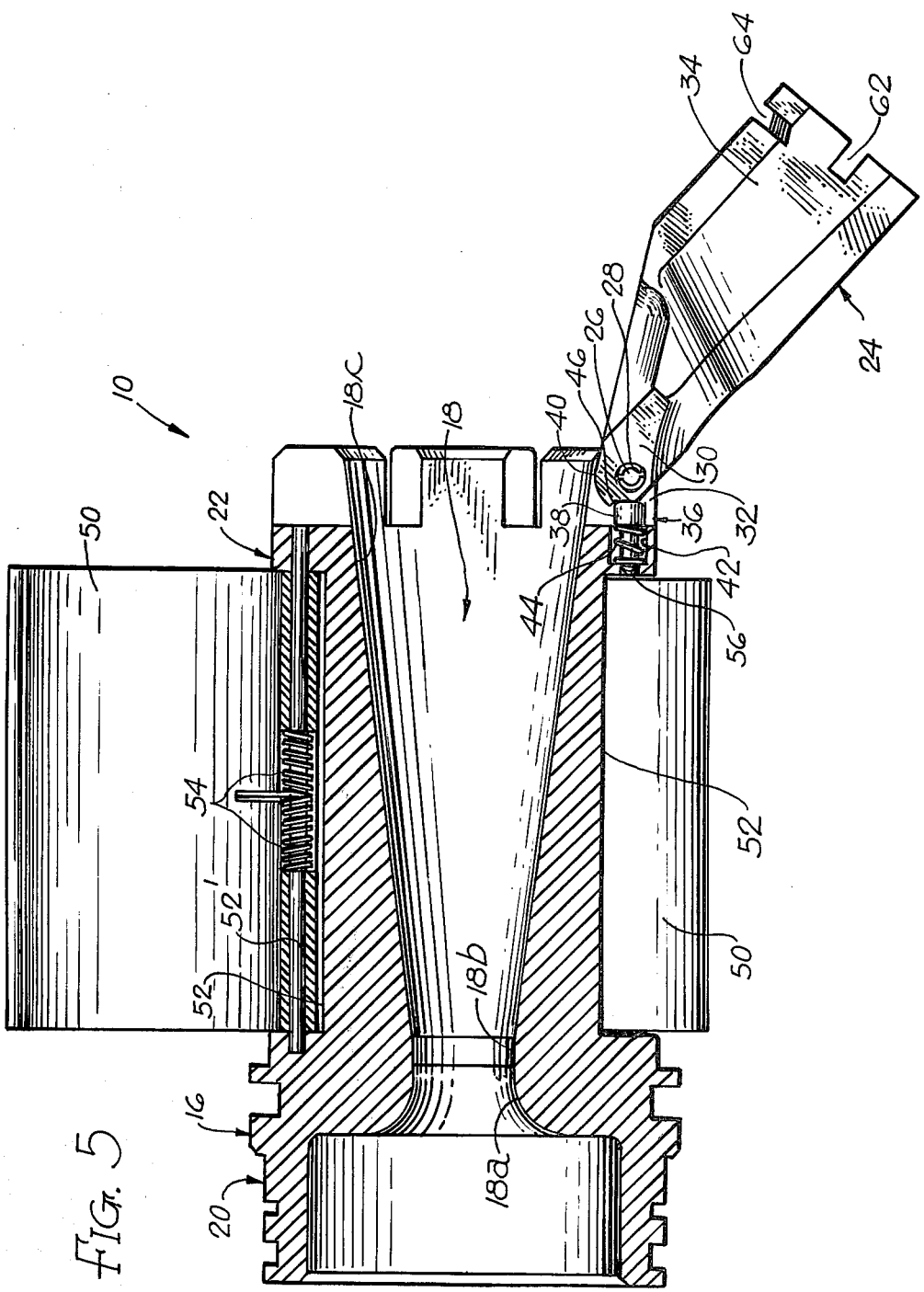
FIG. 5 is a view similar to FIG. 4, but showing the fins in their extended flight positions.

The folding fins 24 are swingable between their retracted launch positions, as shown in FIGS. 1 and 4, and their extended flight positions, as shown in FIGS. 2, 3 and 5. The fins 24 are in their folded or retracted positions when the rocket 12 is in the launching tube. When the rocket 12 is launched into free flight from the launching tube, the folding fins 24 are swung outwardly to their fully extended or deployed positions, in which they extend at approximately 45° to the axis of the rocket 12. When extended, the fins 24 stabilize the flight of the rocket. The fins 24 are swung outwardly by the gaseous propulsion stream and also by centrifugal action, due to the spin of the rocket.

In order to impart spin to the rocket 12, the folding fins 24 have bent, skewed or canted portions 34, which are opposite the rear portion 18c of the nozzle opening 18, when the fins 24 are in their retracted launch positions. Thus, the bent portions 34 are positioned in the gaseous propulsion stream when the fins 24 are folded. The skewing of the bent fin portions 34 is approximately helical.

The gaseous propulsion stream from the nozzle opening 18 impinges upon the bent or skewed fin portions 34 and imparts a rotational torque to the rocket 12, so that the rocket is caused to spin about its longitudinal axis. The spinning movement imparts greatly enhanced stability to the rocket after it is launched into free flight from the launching tube.

After the rocket 12 has been launched into free flight, the folding fins 24 are swung outwardly into their fully extended flight positions, as previously described. The outward swinging movement of the fins 24 carries the bent fin portions 34 outwardly, out of the gaseous propulsion stream, as shown to best advantage in FIG. 5. Thus, the gaseous propulsion stream no longer impinges upon the fins 24, and thus no longer imparts a rotational torque to the rocket. It has been found that it is highly advantageous to move the fins out of the gaseous propulsion stream during free flight, because the impingement of the gaseous propulsion stream upon the fins during free flight would tend to cause yawing movement of the rocket 12, which would impair the stability and accuracy of the rocket.

The conformation of the folding fins 24 is such that they are aerodynamically neutral when the fins are swung outwardly about their pivots to their fully extended flight positions. Thus, the fins 24 do not cause any additional spinning movement of the rocket. To such end, the bent portions 34 of the fins 24 are bent along bend lines 35 (FIG. 6) which are parallel with the longitudinal axis of the nozzle body 16 when the fins are extended to their free-flight positions. Each bend line 35 is preferably in a central longitudinal radial plane which includes the axis of the nozzle body. When the fins are swung inwardly to their retracted launch positions, the bend lines 35 are no longer parallel with the axis, so that the bent portions 34 of the fins 24 are skewed or canted relative to the axis of the nozzle body 16.

The outwardly deployed fins 24 provide fin stabilization for the free flight of the rocket 12. However, no additional spin is imparted to the rocket.

It is advantageous to provide means for holding the fins 24 in their outwardly extended flight positions. In the illustrated construction, the fins 24 are held in their outwardly swung positions by detent means 36, which may comprise movable detent elements 38, resiliently biased against detent cams 40 on the inner end portions 30 of the folding fins 24. The illustrated detent elements 38 are in the form of pins which are slidably mounted in openings 42, formed in the nozzle body 16. Each detent element 38 is biased against the corresponding cam 40 by a spring 44.

When each folding fin 24 is swung outwardly to its extended flight position, the corresponding detent element 38 is moved behind a shoulder 46 on the detent cam 40, with the result that the fin 24 is held in its extended flight position. The shoulder 46 abuts against the detent element 38 and prevents inward movement of the fin 24 from its free-flight position by the force of air resistance due to the slip stream of the rocket. Thus, the fins 24 are held in their fully deployed positions throughout the free flight of the rocket 12.

In the illustrated construction, the movement of the detent elements 38 is employed to control the deployment of additional folding fins 50, which are illustrated as wrap-around fins, adapted to be folded into retracted positions within a cylindrical recess 52, formed in the nozzle body 16. The wrap-around fins 50 are swingably supported by pivot pins 52′ for swinging movement between their retracted launch positions, as shown in FIGS. 1 and 4, and their extended flight positions, as shown in FIGS. 2, 3 and 5. Preferably, the wrap-around fins are outwardly biased toward their fully deployed positions by resilient means, illustrated as springs 54. It will be understood that the fully deployed wrap-around fins 50 provide additional fin stabilization for the free flight of the rocket.

Before and during the launching of the rocket 12, the wrap-around fins 50 are retained in their folded positions by the detent elements 38, which have end portions 56 movable into interlocking relation with the wrap-around fins 50, as shown to best advantage in FIG. 4. When the rear fins 24 are folded into their retracted launch positions, the detent cams 40 cause movement of the detent elements 38, so that the front portions 56 of the detent elements move into interlocking relationships with the wrap-around fins 50. In this way, the fins 50 are held in their folded positions. When the rear fins 24 are swung outwardly to their extended flight positions, as shown in FIG. 5, the detent cams 40 allow the detent elements 38 to move rearwardly, under the impetus of the biasing springs 44, with the result that the front portions 56 of the detent elements 38 are moved away from the wrap-around fins 50, whereupon the wrap-around fins are released for outward swinging movement by the springs 54.

This arrangement of the detent elements 38 is highly advantageous, because the retention of the wrap-around fins 50 in their folded positions greatly facilitates the loading of the rockets into their launching tubes. Previously, it has been a common practice to employ the short-circuiting wire to hole such wrap-around fins in their folded positions. In this prior arrangement, the short-circuiting wire is wrapped around the wrap-around fins to hold them in their folded positions during shipment and storage of the rocket. When the rocket is to be loaded into its launching tube, the short-circuiting wire must be removed, and the wrap-around fins must be held manually in their folded positions until the rocket is within the launching tube.

A plastic ring-shaped retainer 60 is mounted on the rear fins 24, as shown in FIGS. 4, 9 and 10, to hold them in their retracted positions for shipment and storage. This retainer 60 also provides an insulating mounting for the firing contact plate 61. The retainer 60 with the firing contact 61 is blown off when the rocket motor is ignited.

Notches 62 and 64 are provided in the fins 24 to receive the retaining ring 60. The notches 62 and 64 are in the rear and inner edges of the fins 24 (FIGS. 4 and 7). The illustrated retainer 60 (FIGS. 4 and 10) has a peripheral generally cylindrical ring-shaped flange 66 adapted to be received in the rear notches 62. The flange 66 projects from a flat circular radial end wall 68 on which the contact plate 61 is mounted. The ignition wire 70 for the rocket motor is electrically connected to the plate 61. The end wall 68 is formed with a generally cylindrical axial projection or hub 72, from the end of which a radial discshaped flange 74 projects. The flange 74 is adapted to be received in the inner notches 64 formed in the fins 24. The retainer 60 is preferably made of an electrically insulating material, such as a resinous plastic.

Because of the reception of the peripheral ring-shaped flange 66 in the notches 62, formed in the fins 24, the retainer 60 prevents outward swinging movement of the fins 24. The radial flange 74 on the retainer 60 interlocks with the notches 64 in the inner edges of the fins 24, to prevent accidental detachment of the retainer 60 from the fins 24. Thus, the retainer 60 prevents outward swinging movement of the fins 24 during handling, shipment, storage and loading of the rocket 12 into its launching tube.

When the rocket motor is fired or ignited, the gaseous propulsion stream from the rocket motor blasts the retainer 60 away from the fins 24, so that they are free to swing outwardly to their flight positions, when the rocket emerges from its launching tube.

When the fins 24 are retracted, the bent portions 34 of the fins are skewed and are in generally helical positions relative to the longitudinal axis of the nozzle body 16. Moreover, the bent portions 34 are opposite the nozzle opening 18, with the result that the gaseous propulsion stream of the rocket impinges against the bent portions 34 and imparts spinning movement to the rocket, about its longitudinal axis.

When the rocket emerges from its launching tube, the gaseous propulsion stream forces the fins 24 outwardly to their flight positions, in which the bent portions 34 are no longer in the gaseous propulsion stream. Moreover, the bend lines 34 of the fins 24 are parallel to the longitudinal axis of the nozzle body 16. Thus, the fins 24 are aerodynamically neutral, so that no further spin is imparted to the rocket, either by the gaseous propulsion stream or by the forces of air resistance, due to the slip stream of the rocket. The fins 24 continue to produce fin stabilization of the rocket. Additional fin stabilization is provided by the wrap-around fins 50 which are released for outward swinging movement when the rear fins 24 swing outwardly.

I claim:

1. A fin and nozzle unit for a rocket, comprising
a generally cylindrical nozzle body having rearwardly directed nozzle means thereon for discharging propulsion gases,
said nozzle body having a rear end portion,
a plurality of fins, and
pivot means swingably mounting said fins on said rear end portion of said body for swinging movement between retracted launch positions and extended flight positions in which said fins are swung outwardly from said launch positions through a predetermined angle,
said fins having skewed portions which are positioned opposite said nozzle means and in paths traversed by said propulsion gases when said fins are in said retracted launch positions for causing said propulsion gases to act upon said skewed portions to produce spinning movement of the rocket,
said skewed portions being carried outwardly out of said propulsion gases when said fins are swung outwardly into said extended flight positions to avoid imparting further spin to the rocket when said fins are in said extended flight positions,
said fins having a conformation which is aerodynamically neutral when said fins are in said extended flight positions to avoid imparting further spin to the rocket.

2. A fin and nozzle unit for a rocket, comprising
a generally cylindrical nozzle body having rearwardly directed nozzle means thereon for discharging propulsion gases,
said nozzle body having a rear end portion,
a plurality of fins, and
pivot means swingably mounting said fins on said rear end portion of said body for swinging movement between retracted launch positions and extended flight positions in which said fins are swung outwardly from said launch positions through a predetermined angle,
said fins having skewed portions which are positioned opposite said nozzle means and in paths traversed by said propulsion gases when said fins are in said retracted launch positions for causing said propulsion gases to act upon said skewed portions to produce spinning movement of the rocket,
said skewed portions being carried outwardly out of said propulsion gases when said fins are swung outwardly into said extended flight positions to avoid imparting further spin to the rocket when said fins are in said extended flight positions,
said skewed portions being bent about bend lines which are substantially parallel with the longitudinal axis of said nozzle body when said fins are in their extended flight positions whereby said fins are aerodynamically neutral when in said extended flight positions to avoid imparting further spin to the rocket.

3. A fin and nozzle unit for a rocket, comprising
a generally cylindrical nozzle body having rearwardly directed nozzle means thereon for discharging propulsion gases, said nozzle body having a rear end portion,
a plurality of first fins,
pivot means swingably mounting said first fins on said rear end portion of said body for swinging movement between retracted launch positions and extended flight positions in which said first fins are swung outwardly from said launch positions through a predetermined angle,
said first fins having skewed portions which are positioned opposite said nozzle means and subject to the discharging propulsion gases when said first fins are in said retracted launch positions to produce spinning movement of the rocket,
said skewed portions being carried outwardly out of the discharging propulsion gases when said first fins are swung outwardly into said extended flight positions to avoid imparting further spin to the rocket when said first fins are in said extended flight positions,
said unit including a plurality of second fins,
additional pivot means swingably mounting said second fins on said nozzle body for swinging movement between retracted launch positions and extended flight positions,
resilient means biasing said second fins outwardly toward said extended flight positions,
a plurality of movable detent elements,
means movably mounting said detent elements on said nozzle body,
spring means biasing said movable detent elements towards said first fins, and
detent cams on said first fins for engaging said detent elements to hold said first fins in said extended flight positions after said first fins are swung outwardly to said extended flight positions,
said detent cams having conformations to cause movement of said detent elements between first positions when said first fins are in said retracted launch positions and second positions when said first fins are in said extended flight positions,
said detent elements having portions for retaining said second fins in said retracted launch positions when said detent elements are in said first positions,
the movement of said detent elements to said second positions being effective to release said second fins for outward swinging movement by said resilient means to said extended flight positions.

4. A fin and nozzle unit according to claim 3, in which said detent elements take the form of movable pins having opposite end portions engageable with said detent cams and said second fins.

5. A fin and nozzle unit for a rocket, comprising
a generally cylindrical nozzle body having rearwardly directed nozzle means thereon for discharging propulsion gases,
said nozzle body having a rear end portion,
a plurality of first fins,
pivot means swingably mounting said first fins on said rear end portion of said body for swinging movement between retracted launch positions and extended flight positions in which said first fins are swung outwardly from said launch positions through a predetermined angle,
said first fins having skewed portions which are positioned opposite said nozzle means and subject to the discharging propulsion gases when said first fins are in said retracted launch positions to produce spinning movement of the rocket,
said skewed portions being carried outwardly out of the discharging propulsion gases when said first fins are swung outwardly into said extended flight positions to avoid imparting further spin to the rocket when said first fins are in said extended flight positions,
said unit including a plurality of wrap-around fins,
additional pivot means swingably mounting said wrap-around fins on said nozzle body for swinging movement between retracted launch positions and extended flight positions,
resilient means biasing said wrap-around fins outwardly toward said extended flight positions,
a plurality of movable detent elements,
means movably mounting said detent elements on said nozzle body,
detent cams on said first fins for engaging said detent elements, and
spring means biasing said movable detent elements toward said detent cams,
said detent cams having formations for causing movement of said detent elements between first positions when said first fins are in said retracted launch positions and second positions when said first fins are in said extended flight positions,
said formations and said detent elements being effective to hold said first fins in said extended flight positions,
said detent elements having portions for engaging and retaining said wrap-around fins in said retracted launch positions when said detent elements are in said first positions,
the movement of said detent elements to said second positions being effective to release said wrap-around fins for outward swinging movement by said resilient means to said extended flight positions.

6. A fin and nozzle unit according to claim 5, in which said detent elements take the form of movable pins having first end portions engageable with said detent cams and second end portions engageable with said wrap-around fins.

7. A fin and nozzle unit according to claim 5, in which said formations take the form of shoulders on said detent cams.

8. A fin and nozzle unit according to claim 5, including retaining means mounted on said first fins for retaining said first fins in said retracted launch positions prior to launch.

9. A fin and nozzle unit for a rocket, comprising
a generally cylindrical nozzle body having an axial nozzle opening therein for discharging a gaseous propulsion stream,
said nozzle body having a rear end portion,
a plurality of fins, and
pivot means swingably mounting said fins on said rear end portion of said body for swinging movement between retracted launch positions and extended flight positions in which said fins are swung outwardly from said retracted launch positions through a predetermined angle,
said fins having bent portions which are in skewed positions opposite said nozzle opening and in said gaseous propulsion stream when said fins are in said retracted launch positions for causing the gaseous propulsion stream to act upon said bent portions so as to produce spinning movement of the rocket, said bent portions being carried outwardly out of said gaseous propulsion stream when said fins are swung outwardly into said extended flight positions, said bent portions being bent about lines which are parallel with the axis of said nozzle body when said fins are in said extended flight positions whereby said fins are then aerodynamically neutral to avoid imparting further spin to the rocket when said fins are in said extended flight positions.

10. A fin and nozzle unit for a rocket, comprising a generally cylindrical nozzle body having rearwardly directed nozzle means thereon for discharging propulsion gases, said nozzle body having a rear portion, a plurality of first fins, pivot means swingably mounting said first fins on said rear portion of said body for swinging movement between retracted launch positions and extended flight positions in which said first fins are swung outwardly from said launch positions, said first fins having portions opposite said nozzle means and in the path of said propulsion gases when said first fins are in said retracted launch positions, a plurality of second fins, additional pivot means swingably mounting said second fins on said nozzle body for swinging movement between retracted launch positions and extended flight positions, resilient means biasing said fin members second fins outwardly toward said extended flight positions, and means operable by said first fins for retaining said second fins in said retracted launch positions when said first fins are in their retracted launch positions, said last mentioned means being operable by outward swinging movement of said first fins to release said second fins for outward swinging movement to said extended flight positions.

11. A fin and nozzle unit according to claim 10, including retaining means for retaining said first fins in said retracted launch positions, said retaining means being positioned opposite said nozzle means and being adapted to be blasted away by the propulsion gases when the rocket is ignited.

12. A fin and nozzle unit according to claim 11, in which said retaining means include means for holding said retaining means on said first fins against accidental detachment, said last mentioned means being overcome by the propulsion gases of the rocket.

13. A fin and nozzle unit according to claim 11, in which said retaining means include means for interlocking with the first fins for holding the retaining means on the first fins against accidental detachment, said last mentioned means being overcome by the propulsion gases of the rocket.

14. A fin and nozzle unit according to claim 11, in which said retaining means include a retainer made of electrically insulating material and mounted on said first fins, and an electrical contact mounted on said retainer for receiving an electrical current to ignite the rocket.

* * * * *

UNITED STATES PATENT AND TRADEMARK OFFICE
CERTIFICATE OF CORRECTION

PATENT NO. : 4,203,569
DATED : May 20, 1980
INVENTOR(S) : William S. Marks

It is certified that error appears in the above-identified patent and that said Letters Patent are hereby corrected as shown below:

Column 1, line 31, "dispresion" should be -- dispersion --

Column 2, line 12, "detect" should be -- detent --

Column 5, line 6, "hole" should be -- hold --

Column 9, line 32, delete "fin members"

Signed and Sealed this

Twenty-fourth Day of March 1981

[SEAL]

Attest:

RENE D. TEGTMEYER

Attesting Officer  Acting Commissioner of Patents and Trademarks